(12) United States Patent
Rahardja et al.

(10) Patent No.: US 9,473,562 B2
(45) Date of Patent: Oct. 18, 2016

(54) MEDIATED DATA EXCHANGE FOR SANDBOXED APPLICATIONS

(71) Applicant: Apple Inc., Cupertino, CA (US)

(72) Inventors: David Rahardja, Cupertino, CA (US); Toby C. Paterson, Cupertino, CA (US); Anthony D'Auria, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 441 days.

(21) Appl. No.: 14/025,696

(22) Filed: Sep. 12, 2013

(65) Prior Publication Data

US 2015/0074165 A1 Mar. 12, 2015

(51) Int. Cl.
*H04L 29/08* (2006.01)
*G06F 9/455* (2006.01)
*G06F 9/54* (2006.01)
*G06F 21/60* (2013.01)

(52) U.S. Cl.
CPC ........... *H04L 67/10* (2013.01); *G06F 9/45533* (2013.01); *G06F 9/545* (2013.01); *G06F 21/606* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 7,835,532 B2 | 11/2010 | Yonehara et al. | |
| 7,941,457 B2 | 5/2011 | Pfeiffer et al. | |
| 8,438,640 B1* | 5/2013 | Vaish | G06F 21/53 713/189 |
| 9,032,303 B2* | 5/2015 | Hall | H04L 67/025 709/203 |
| 2007/0116036 A1 | 5/2007 | Moore | |
| 2007/0198291 A1 | 8/2007 | Pfeiffer et al. | |
| 2010/0146523 A1* | 6/2010 | Brigaut | G06F 17/30203 719/330 |
| 2011/0099609 A1* | 4/2011 | Malhotra | G06F 21/53 726/4 |
| 2011/0153712 A1* | 6/2011 | Whetsel | G06F 17/30569 709/201 |
| 2012/0284702 A1* | 11/2012 | Ganapathy | G06F 9/468 717/174 |
| 2012/0303425 A1* | 11/2012 | Katzin | G06Q 20/027 705/14.4 |
| 2012/0304119 A1* | 11/2012 | Hoogerwerf | G06F 17/30126 715/810 |
| 2012/0304283 A1* | 11/2012 | Beam | G06F 21/53 726/17 |
| 2013/0179414 A1* | 7/2013 | Hoogerwerf | G06F 17/30115 707/694 |
| 2013/0219176 A1 | 8/2013 | Akella et al. | |

FOREIGN PATENT DOCUMENTS

| | | |
|---|---|---|
| TW | 200923718 | 6/2009 |
| TW | 200949664 | 12/2009 |
| TW | 201203049 | 1/2012 |

OTHER PUBLICATIONS

Thesoundtestroom: "A Beginners Guide to Audiobus", Mar. 21, 2013, XP054975572, Retrieved from the internet: URL: https://www.youtube.com/watch?v=hPZ6FV537yg [retrieved on Oct. 23, 2014] the whole document.
AudiobusApp: "Audiobus Introduction", Dec. 9, 2012, XP054975573, Retrieved form the internet: URL:https://www.youtube.com/watch?v=_ylbKW3Q3MY [retrieved on Oct. 23, 2014] the whole document.

* cited by examiner

*Primary Examiner* — Natisha Cox
(74) *Attorney, Agent, or Firm* — Nicholas Panno; DLA Piper LLP US

(57) ABSTRACT

The described embodiments include a computing device that executes a broker application. The broker application performs a mediated data exchange to exchange data between a first sandboxed application and a second application. For example, the broker application can import data from the second application into the first sandboxed application. As another example, the broker application can export data from the first sandboxed application into the second application.

30 Claims, 7 Drawing Sheets

MEDIATED DATA EXCHANGE FOR SANDBOXED APPLICATIONS

BACKGROUND

1. Field

The described embodiments relate to computing devices. More specifically, the described embodiments relate to a mediated data exchange between sandboxed applications executing on a computing device.

2. Related Art

Some operating systems for computing devices support "sandboxing." Sandboxing is a technique that is used to prevent applications executing on a computing device from maliciously or mistakenly altering data (e.g., files) and/or misusing computational resources on the computing device. When "sandboxed," an application is permitted by the operating system to access only a limited set of resources in the computing device and is prevented from accessing data other than the application's own data. Thus, for example, in these computing devices, the application is allowed to freely access (i.e., read from, write to, delete, etc.) the application's own files, but the application is blocked by the operating system from accessing files belonging to other applications.

Although sandboxing is useful for preventing applications from maliciously or mistakenly altering data and/or misusing computational resources on the computing device, sandboxing significantly limits interactions between applications. For example, although being able to create and/or modify its own files, a sandboxed application is unable to communicate those files to another application or to receive files from another application. Placing such limits on the interactions for sandboxed applications can frustrate users, who are accustomed to non-sandboxed applications that can communicate freely. To avoid frustrating users, designers have provided workarounds to enable sandboxed applications to interact with other applications. For example, designers have added customized program code to one or both of the sandboxed application and the other application, as well as the operating system, to enable rudimentary interactions between a given sandboxed application and one other application. However, existing workarounds require that application program code and/or operating system code be modified on a case-by-case basis to enable the workarounds.

BRIEF DESCRIPTION OF THE FIGURES

Throughout the figures and the description, like reference numerals refer to the same figure elements.

DETAILED DESCRIPTION

Figure 1:
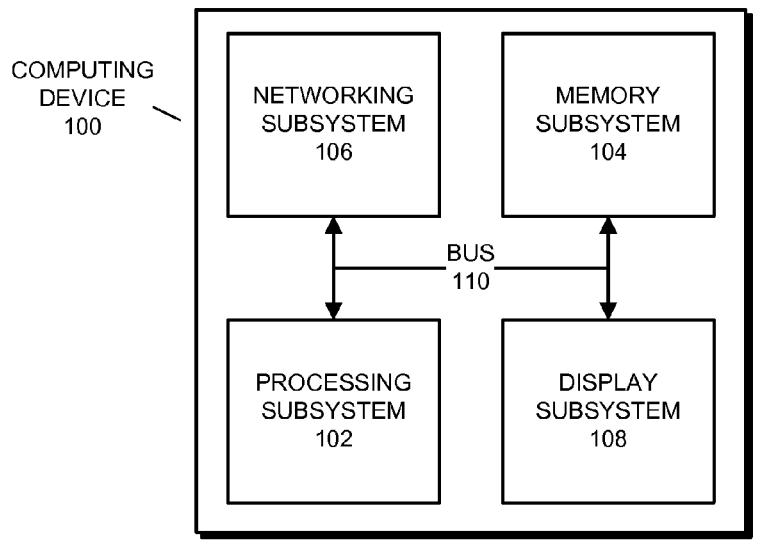
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware/microcode, etc.) to perform the operations.

In some embodiments, a data structure representative of some or all of the structures and mechanisms described herein (e.g., some or all of computing device 100 (see FIG.

1)) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits (e.g., logic circuits, memory circuits, control circuits, etc.) that perform the described operations. In some embodiments, the circuits in a functional block include circuits that execute program code (e.g., machine code, firmware, etc.) to perform the described operations.

Overview

In the described embodiments, at least one application executes in a "sandbox" that is maintained for the application by an operating system on a computing device on which the application is executed. In these embodiments, a sandbox is generally a limitation in the data and resources on the computing device that are accessible by a sandboxed application. For example, in some embodiments, a sandboxed application (i.e., an application that is operating within the constraints of a sandbox) is limited to accessing the application's own data (e.g., files) and certain resources in the computing device (e.g., areas in a memory for the computing device, etc.)—and thus is prevented from accessing files and/or resources outside the sandbox. The described embodiments include a broker application that enables a mediated data exchange between sandboxed applications and other applications operating on the computing device (including other sandboxed applications).

To perform the mediated data exchange, in some embodiments, the broker application receives a communication from a sandboxed application indicating that the sandboxed application wishes to import or export data of a given type (e.g., text, a document file, an image/video file, a streamed file, etc.). The broker application then determines one or more other applications on the computing device that have registered with the broker as being able to handle data of that type. Next, the broker application communicates an identifier of available other applications (e.g., to a user via a display of computing device 100) and receives a response that indicates one of the other applications that is to participate in the import or export of the data. The broker then activates the other application and exchanges the data between the applications. For example, in the event that data is to be imported into the sandboxed application from another application, the broker application may request the data from the selected other application, receive the requested data, and forward the data to the sandboxed application. As another example, in the event that data is to be exported from the sandboxed application to another application, the sandboxed application may indicate the data to the broker and the broker may request a location (e.g., in a memory or in a directory in a file system) for placing the data from the selected other application and then may place the data in the location.

In the described embodiments, during the mediated data exchange, the sandbox for the sandboxed application is maintained; the sandboxed application is not allowed direct access to data or resources outside the sandbox. Instead, the broker application (which has permissions within and outside the sandbox) receives communications from the sandboxed application and communicates on behalf of the sandboxed communication with the selected other application, including handling the exchange of data to and from the sandbox.

As described above, in the described embodiments, the broker application performs mediated data exchanges for importing data to or exporting data from sandboxed applications on a computing device. Because the broker application has simplified and known interfaces, the described embodiments avoid the need for significant custom programming for the application and/or operating system to enable sandboxed applications to import or export data.

Computing Device

FIG. 1 presents a block diagram of computing device 100 in accordance with the described embodiments. As can be seen in FIG. 1, computing device 100 includes processing subsystem 102, memory subsystem 104, networking subsystem 106, and display subsystem 108.

Processing subsystem 102 is a functional block that is configured to perform computational operations in computing device 100. For example, processing subsystem 102 can include, but is not limited to, one or more processors and/or processor cores (e.g., central processing unit (CPU) cores, graphics processing unit (GPU) cores, etc.), application-specific integrated circuits (ASICs), microcontrollers, and/or programmable-logic devices.

Memory subsystem 104 is a functional block that is configured to store data and/or instructions for use by processing subsystem 102, networking subsystem 106, and/or display subsystem 108. For example, memory subsystem 104 can include, but is not limited to, one or more of static random access memory (SRAM), embedded dynamic random access memory (eDRAM), DRAM, double data rate synchronous DRAM (DDR SDRAM), flash memory, and/or other types of memory circuits, along with circuits for controlling access to the memory. In some embodiments, memory subsystem 104 includes a memory hierarchy with an arrangement of one or more caches coupled to a memory for computing device 100. In some of these embodiments, processing subsystem 102 also includes one or more caches. In addition, in some embodiments, memory subsystem 104 is coupled to one or more high-capacity mass-storage devices (not shown). For example, memory subsystem 104 may be coupled to a magnetic or optical drive, a solid-state drive, and/or another type of mass-storage device.

Networking subsystem 106 is a functional block configured to access, couple to, and communicate on one or more wired and/or wireless networks. For example, networking subsystem 106 can include, but is not limited to, a Bluetooth™ networking system, a cellular networking system (e.g., EDGE, UMTS, HSDPA, LTE, etc.), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., a network based on the standards described in IEEE 802.15, etc.). Networking subsystem 106 includes controllers, radios/antennas for wireless network connections, sockets/plugs for hard-wired electrical connections, and/or other devices used for coupling to, communicating on, and handling data and events on a wired and/or wireless network.

Display subsystem 108 is a functional block configured to display information (e.g., user interfaces, graphics, etc.) on one or more interfaces (e.g., display screens, indicators, light-emitting diodes, etc.) of computing device 100. For example, display subsystem 108 can include, but is not limited to, a touch-sensitive display screen and the circuits and mechanisms for displaying information on the display screen.

Within computing device 100, processing subsystem 102, memory subsystem 104, networking subsystem 106, and display subsystem 108 (collectively, "the subsystems") are coupled together by bus 110. Bus 110 includes one or more signal lines, controllers, etc. that the subsystems can use to communicate with one another. For example, bus 110 can include one or more packet buses, dedicated signal lines, etc.

Computing device 100 can be, or can be incorporated into, any of a number of different types of devices. Generally, these devices include any device that can perform the operations herein described. For example, computing device 100 can be, or can be incorporated into, a desktop computer, a laptop computer, a server, a media player, an appliance, a subnotebook/netbook, a tablet computer, a cellular phone, a piece of testing equipment, a network appliance, a set-top box, a personal digital assistant (PDA), a smart phone, a toy, a controller, or another device.

Although embodiments are described using a particular number and arrangement of subsystems, some embodiments include a different number and/or arrangement of subsystems. For example, some embodiments include two, four, or a different number of processing subsystems. As another example, in some embodiments, computing device 100 includes additional subsystems. In these embodiments, computing device 100 can include, but is not limited to, one or more power subsystems (that provide power to the illustrated subsystems from one or more external sources, batteries, etc.), media processing subsystems (e.g., audio/video processors, etc.), and/or input-output subsystems (keyboard, mouse, touch-sensitive display, etc.). As another example, in some embodiments, computing device 100 does not include networking subsystem 106. Generally, the described embodiments can include any arrangement of subsystems that can perform the operations herein described.

Operating System and Applications

Figure 2:
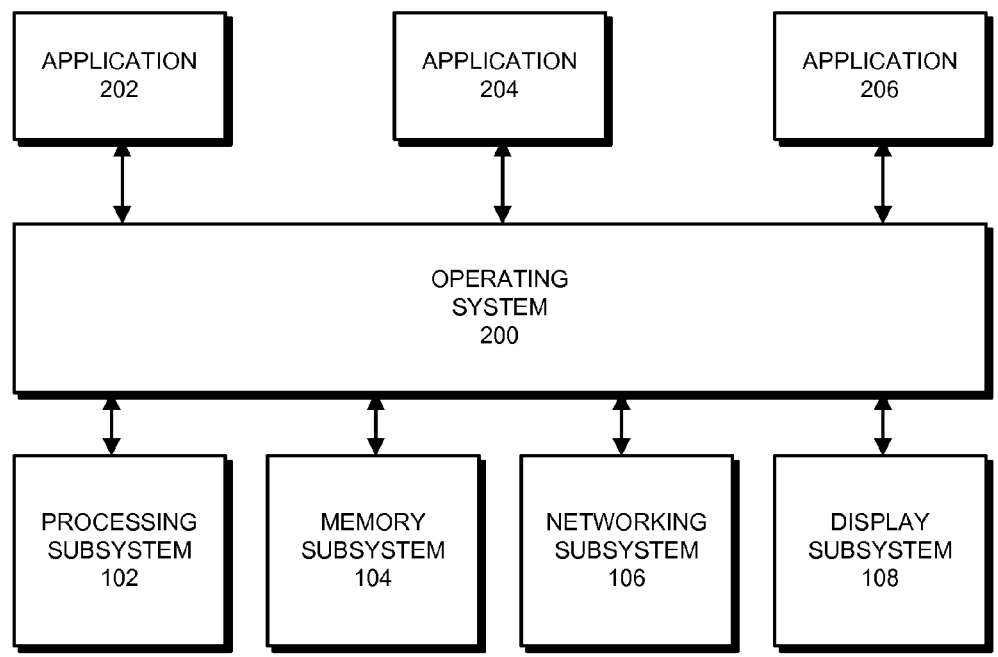
FIG. 2 presents an operating system and applications in accordance with the some embodiments.

FIG. 2 presents an operating system 200 in accordance with the described embodiments. Generally, operating system 200, which is executed by processing subsystem 102, serves as an intermediary between hardware (e.g., subsystems 102-108) and software (e.g., applications, programs, drivers, and other software) in computing device 100 and applications executed by processing subsystem 102. Operating system 200 provides known interfaces and mechanisms (application program interfaces, etc.) that enable applications 202-206 to communicate with operating system 200 and the other applications to perform operations. Operating system 200 can be, but is not limited to, the iOS operating system from Apple Inc. of Cupertino, Calif. and/or another operating system. Aside from the operations herein described, operating systems and their general functions are known in the art and hence are not described in detail.

Application 204 and application 206 are software programs that execute on computing device 100 (e.g., are executed by processing subsystem 102 using instructions and data from memory subsystem 104). In some embodiments, applications 202-206 can be any applications that can perform portions of the mediated data exchange herein described. However, in the examples herein, applications 202-206 are a word processing application, a media processing application (e.g., an image editing application for photographs and videos, etc.), and a social media application (e.g., an application for interacting with a social media website, etc.), respectively.

Applications 202-206 are configured to interact with (i.e., generate, edit, interpret, display, and/or perform other operations on or with) various data, including files, streaming data, etc. For example, application 204 may generate, edit, display, and/or perform other operations with media files such as image files (e.g., joint photographic experts group (JPEG), tagged image file format (TIF), bitmap image file (BMP), etc.), video files (QuickTime file format (MOV), audio video interleave (AVI), etc.), audio files (Advanced Audio Coding (AAC), MPEG-2 audio layer III (MP3), etc.), and/or other types of files. Application 206 may display and/or perform other operations with media files including some or all of the types of tiles described above, text files (text (TXT), etc.), rich text format files (RTF), and/or other types of files.

Although embodiments are described using applications 202-206, in some embodiments different types and/or numbers of applications may be present. For example, in some embodiments, applications such as a remote file system application, an office productivity application, etc. are executed by computing device 100 and perform some or all of the operations herein described (with or without applications 202-206).

Figure 3:
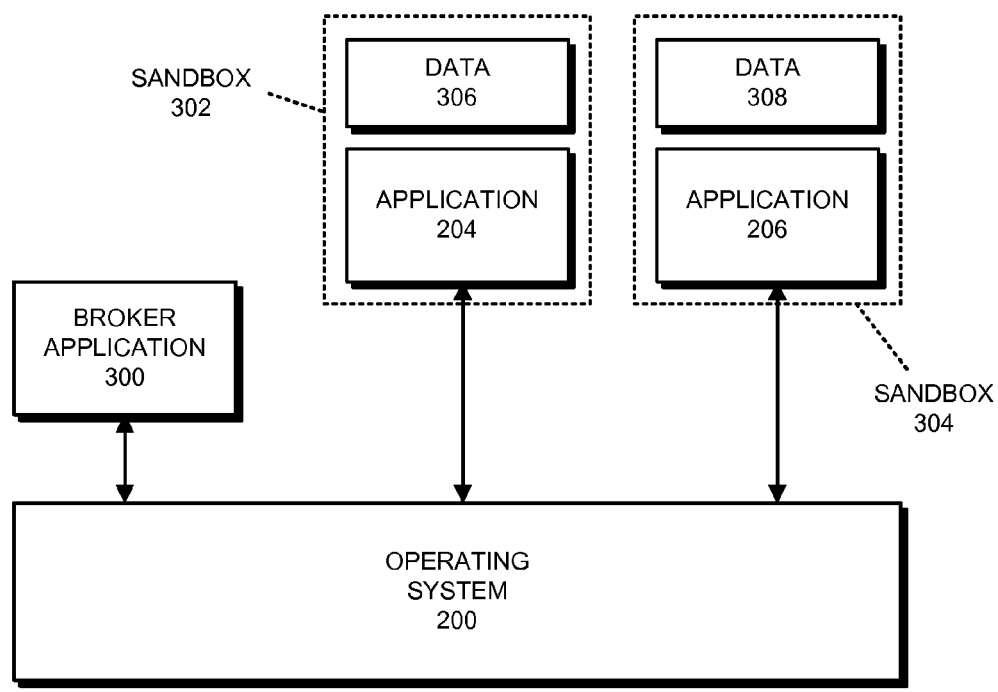
FIG. 3 presents a block diagram illustrating broker application and sandboxes for applications in accordance with some embodiments.

In addition, although shown in FIG. 3 separately from operating system 200, in some embodiments, one or both of applications 204 and 206 are applications, daemons, utilities, routines, etc. (collectively, "utilities") included within operating system 200 (i.e., installed and executed as part of operating system 200, perhaps without a user manually executing the utility). For example, in some embodiments, one or both of applications 204 and 206 are utilities provided by operating system 200 for managing libraries on computing device 100 that contain files such as images, videos, documents, etc. In these embodiments, broker application 300 interacts with the utilities provided by operating system 200 in a similar way to the herein-described interactions with applications 204 and 206. Generally, in the described embodiments, broker application 300 is not limited to interoperating with "third-party" applications such as user-installed applications, but can also interoperate with "first-party" utilities provided by operating system 200.

Broker Application and Sandboxes for Applications

FIG. 3 presents a block diagram illustrating broker application 300 and sandboxes 302 and 304 for applications 204 and 206, respectively, in accordance with some embodiments. Because applications 204 and 206 are sandboxed, applications 204 and 206 are permitted by operating system 200 to access only a limited set of resources in computing device 100 (e.g., certain portions of caches and memories in memory subsystem 104, etc.) and are prevented from accessing application data (e.g., files, streams, state data, etc.) other than their own data. For example, application 204 is permitted by operating system 200 to freely access (i.e., read from, write to, modify, delete, etc.) files and other data in data 306, but application 204 is blocked by operating system 200 from accessing any other application's data, including application 206's data 308. Note that data 306 and data 308 are stored in areas in memory subsystem 104 (e.g., in caches and in a memory) that the corresponding application is permitted to access.

Broker application 300 provides a mediated data exchange service for applications on computing device 100 (e.g., applications 202-206). Generally, a mediated data exchange is a three-entity operation that involves a sandboxed application (e.g., application 204) using broker application 300 as an intermediary for performing a data transfer between the sandboxed application and another application that may or may not be sandboxed (e.g., to import a file to or export a file from a sandboxed application to another application, etc.). In contrast to the sandboxed applications themselves, which are limited by operating system 200 to accessing only certain data and resources in computing device 100, broker application 300 has operating system permissions to freely access data for both sandboxed applications and non-sandboxed applications. In other words, broker application 300 can acquire files and other data (e.g., data 306 and 308) from sandboxed applications as well write data to sandboxed applications to enable the mediated data exchange. For example, broker application 300 can freely read and copy sandboxed application 204's files from directories for application 204 (i.e., from data 306) and can write files to application 206's directories (i.e., to data 308).

As shown in FIG. 3 (by the relative closeness of broker application 300 to operating system 200 in contrast to applications 204 and 206), in some embodiments, broker application 300 is a low-level application (e.g., a daemon, a background application, an operating system process, etc.) that is executed by processing subsystem 102 using instructions and data from memory subsystem 104. In some embodiments, broker application 300 is started (i.e., processing subsystem 102 starts executing broker application 300) as part of a start-up process for computing device 100 and/or operating system 200. Upon being started, broker application 300 may accept and respond to messages from applications 204 and 206 (and other applications in computing device 100) as described in more detail below.

Although both of applications 204 and 206 are shown as being sandboxed, in some embodiments, only one of the applications is sandboxed. However, embodiments in which only one of the applications is sandboxed perform similar operations to import and export data from an application's sandbox.

Registration of Applications with the Broker Application

Figure 4:
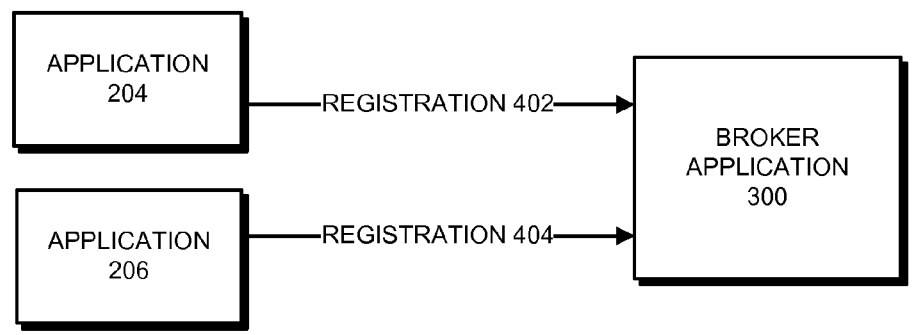
FIG. 4 illustrates communications between applications and a broker application during corresponding registration operations in accordance with some embodiments.

FIG. 4 illustrates communications between application 204 and broker application 300 and between application 206 and broker application 300 during corresponding registration operations in accordance with some embodiments. The registration operation shown in FIG. 4 is performed to register each of application 204 and application 206 with broker application 300 to enable subsequent mediated data exchanges. Note that the operations and communications shown in FIG. 4 are presented as a general example of functions performed by some embodiments. The operations and communications performed by other embodiments include different operations/communications and/or operations/communications that are performed in a different order. Additionally, although applications 204 and 206 are used in describing the process, in some embodiments, other applications perform at least some of the operations.

In the example below, various communications—which are generically referred to as "messages"—are described. Generally, these messages may be exchanged between the indicated entities (e.g., application 204 and broker application 300, etc.) using any communication protocol acceptable to both entities. For example, in some embodiments, the entities use an inter-application messaging mechanism provided by operating system 200 that adheres to a corresponding communication protocol. The messages are formatted (e.g., with header, payload, etc.) in accordance with the communication protocol.

During a registration operation for application 204, application 204 sends a message with registration 402 to broker application 300. Registration 402 generally includes information that enables broker application 300 to interact with application 204 during subsequent operations. For example, in some embodiments, the information in registration 402 includes one or more of: identifiers for application 204, file types supported by application 204, file converters provided by application 204, directory information for application 204, controls on types of mediated data exchanges permitted by application 204, and/or other information for or about application 204. In some embodiments, the identifier for application 204 can include any identifier or combination of identifiers that enables broker application 300 to find and communicate with application 204, such as a file name for an executable, an operating system identifier for application 204, etc. In some embodiments, the file types supported by application 204 includes a list of file types with which application 204 is configured to interact. In some of these embodiments, each file type in the list of file types includes an indication of operations, e.g., edit, display, interpret, etc. that application 204 can perform on or for the file type. In addition, in some embodiments, each file type in the list of file types includes an indication of whether application 204 can import and/or export files of the file type. In some embodiments, the file converters provided by application 204 includes a list of file converters that may be used by application 204 to convert files from a first format to a second format (e.g., from one media format to another, etc.). In some embodiments, the directory structure for application 204 includes one or more identifiers for directories used by application 204 for storing corresponding types of files (e.g., a working directory, a longer-term storage directory, etc.). In some embodiments, the controls on the types of mediated data exchanges permitted by application 204 include an indication of whether import and/or export is permitted during a mediated data exchange, a maximum file size, conditions under which the mediated data exchange is impermissible (e.g., operating state, etc.), and/or other controls.

In addition, during a registration operation for application 206, application 206 sends a message with registration 404 to broker application 300. As described above, registration 404 generally includes information that enables broker application 300 to interact with application 206 during subsequent operations.

In some embodiments, broker application 300 sends an acknowledgement message (not shown) to the registering application after receiving and processing the corresponding registration. Then, after the registration operation is complete, upon receiving a message initiating a mediated data exchange from an application, broker application 300 uses the information acquired from the corresponding registration to facilitate the mediated data exchange (as described in more detail below).

Although FIG. 4 shows registration 402 and registration 404 in the same figure, these messages are not necessarily sent at the same time. For example, in some embodiments, as each of one or both of application 204 and application 206 are installed on computing device 100, the registration operation is performed (at which time the corresponding registration message is sent). As another example, in some embodiments, as one or both of application 204 and application 206 are started for the first time on computing device 100, the registration operation is performed. As yet another example, in some embodiments, as a user performs an operation that may lead to a mediated data exchange, one or both of application 204 and application 206 may prompt the user to generally grant permission for the mediated data exchange and then (assuming the user grants permission) the registration operation is performed.

As described above, although a registration process is illustrated in FIG. 4, In some embodiments, a different registration process is used. For example, in some embodiments, a "passive" registration process is used. In some of these embodiments, for passive registration, one or more installation files for an application include some or all of the above-described information that enables broker application 300 to interact with application 204 during subsequent operations. In some of these embodiments, operating system 200, upon installation of the application, reads the installation files and communicates the registration information to broker application 300. In these embodiments, the communication of the information by operating system 200 to broker application 300 may occur as the application is installed and possibly without the application having been run (i.e., without the application sending registration messages to broker application 300). In some of these embodiments, operating system 200 acquires the information about the application and stores the information (but may communicate some or none of the information to broker application 300 as the application is installed). In these embodiments, broker application 300 may subsequently request the stored information from operating system 200.

In some embodiments, applications (e.g., application 204 and/or 206) may perform one or more registration update operations after the initial registration operation. During a registration update operation, the application updates the above-described information that enables broker application 300 to interact with application 204 during subsequent operations. For example, if the application starts or stops supporting a given file type, starts or stops providing a given converter, etc., the application may perform a registration update to update broker application 300.

Mediated Data Exchange for Exporting Data from a Sandboxed Application

Figure 5:
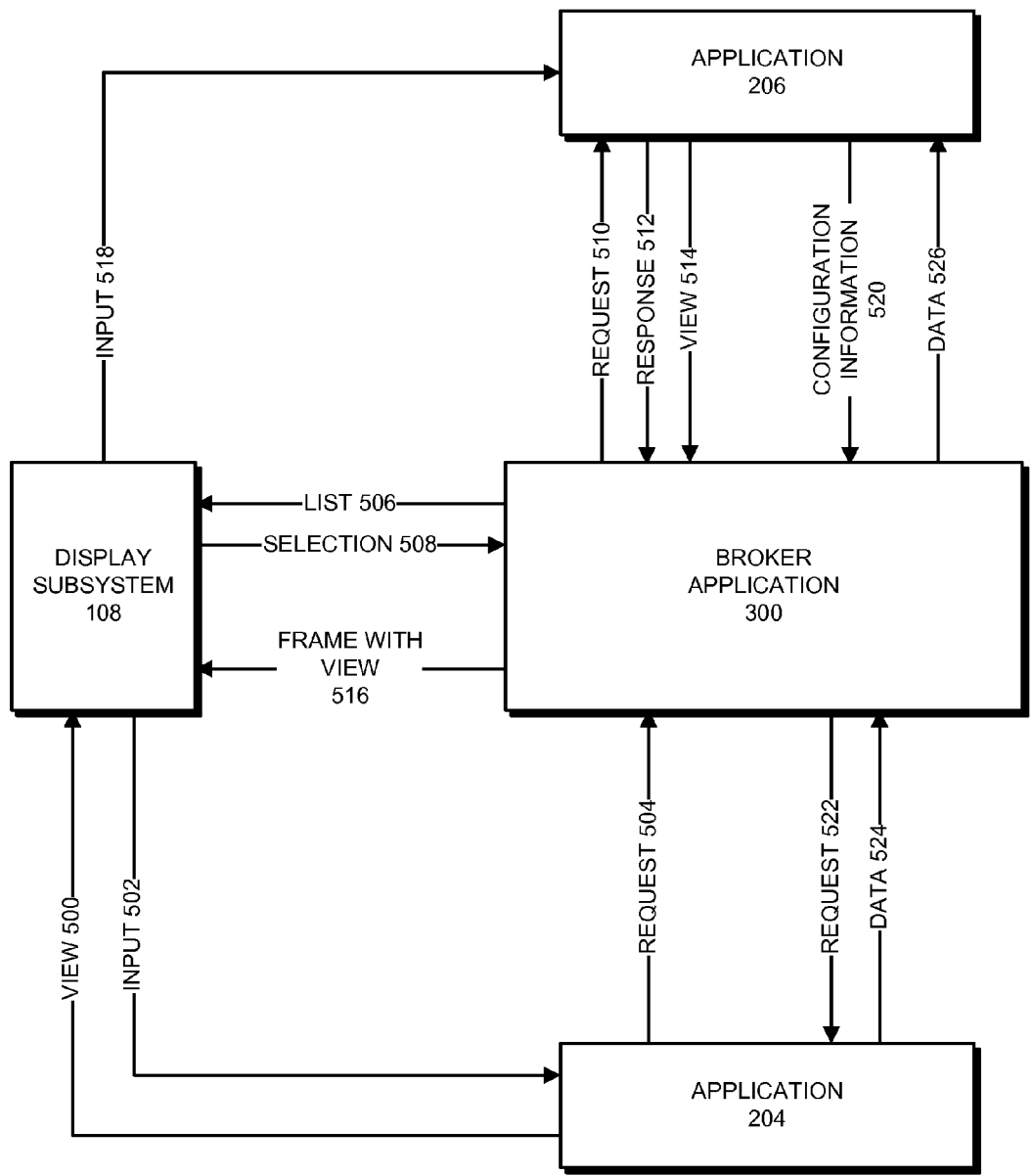
FIG. 5 presents a block diagram illustrating communications between applications and a broker application during a mediated data exchange in accordance with some embodiments.

FIG. 5 presents a block diagram illustrating communications between application 204, application 206, and broker application 300 during a mediated data exchange in accordance with some embodiments. More specifically, the mediated data exchange shown in FIG. 5 is an export of data from application 204 to application 206. Note that the operations and communications shown in FIG. 5 are presented as a general example of functions performed by some embodiments. The operations and communications performed by other embodiments include different operations/communications and/or operations/communications that are performed in a different order. Additionally, although applications 204 and 206 are used in describing the process, in some embodiments, other applications perform at least some of the operations.

For the example shown in FIG. 5, it is assumed that application 204 is a media processing application and application 206 is a social media application. It is also assumed that the data to be exported during the export operation is a JPEG file (i.e., an image file) that was created in application 204 and that the JPEG file is to be uploaded to a social media website using application 206. Although this example is used for FIG. 5, in other embodiments, one or both of application 204 and 206 may be different types of application, and the mediated data exchange may be used to export different types of data from application 204 to application 206. For example, in some embodiments, application 204 is a word processing application and application 206 is a cloud file system application (i.e., an application that enables files to be stored to a server "in the cloud"). In these embodiments, a word processor document may be exported from the word processor application to the cloud file system application for storage in a server in the cloud. As another example, in some embodiments, application 204 is an office productivity application (e.g., a spreadsheet application) and application 206 is a software fax machine application. In these embodiments, a spreadsheet may be created in the office productivity application and exported to the fax machine application for faxing to a receiver. More generally, the described embodiments are operable with any two (or more) applications that can communicate with broker application 300 and export data.

For the example in FIG. 5, it is further assumed that application 204 is sandboxed (as shown in FIG. 3), which means that operating system 200 permits application 204 to access only a limited set of resources in computing device 100 and prevents application 204 from directly accessing application data (e.g., files, etc.) other than application 204's own data. In other words, without broker application 300 functioning as an intermediary as described below, application 204 would be unable to export the data to application 206. For the operations shown in FIG. 5, although shown as sandboxed in FIG. 3, application 206 may or may not be sandboxed (the communications/operations for the mediated data exchange are similar).

In the example below, various communications—which are generically referred to as "messages"—are described. Generally, these messages may be exchanged between the indicated entities (e.g., application 204 and broker application 300, etc.) using any communication protocol acceptable to both entities. For example, in some embodiments, the entities use an inter-application messaging mechanism provided by operating system 200 that adheres to a corresponding communication protocol. The messages are formatted (e.g., with header, payload, etc.) in accordance with the communication protocol.

The communications shown in FIG. 5 start when application 204 sends view 500 to display subsystem 108. View 500 is an interactive graphical user interface for application 204 that provides the user with graphical elements (areas of text and/or graphics, buttons, menus, sliders, scrollbars, etc.) for interacting with application 204 (i.e., for controlling the operation of application 204). At least some of the graphical elements in view 500 include "export" graphical elements. These elements enable a user of computing device 100 to indicate that an export operation is to be performed to export specified data from application 204 to another application. When the user activates the graphical elements, e.g., hovers a mouse over an export menu item and clicks to select, touches a touch-sensitive screen over an export button, types in/selects a data identifier, etc., input 502 is generated by display subsystem 108 (or an input-output subsystem (not shown) of computing device 100) and is sent to application 204. For this example, it is assumed that the user activates the graphical elements in view 500 to indicate to application 204 that the JPEG file is to be exported, thereby causing a corresponding input 502 to be sent to application 204.

Upon receiving input 502 and determining that the data (i.e., a JPEG) is to be exported, application 204 sends a message with request 504 to broker application 300 to start the mediated data exchange with broker application 300. Generally, request 504 identifies the type of mediated data exchange and identifies the data, along with possibly including other information about the export. Thus, as described above, request 504 identifies the mediated data exchange as an export and identifies the file as the JPEG. Request 504 may also indicate file formats into which the data may be converted by application 204 (although this information may have been or may also have been indicated in the above-described registration). For example, if application 204 can convert the JPEG file to a TIFF file, request 504 may indicate this capability of application 204.

Broker application 300 analyzes request 504 to determine the type of mediated data exchange being requested by application 204 and the data to be exchanged. Upon determining from request 504 that a JPEG is to be exported from application 204, broker application 300 examines registration information from other applications in computing device 100 and determines that application 206 (and possibly other applications, e.g., application 202, etc.) either supports JPEGs directly, or one of application 204 or 206 provides a converter to convert JPEG to a file format that application 206 supports. For this example, it is assumed that application 206 supports JPEGs directly; otherwise a conversion operation may be performed by application 204 and/or application 206 during the mediated data exchange.

Figure 6:
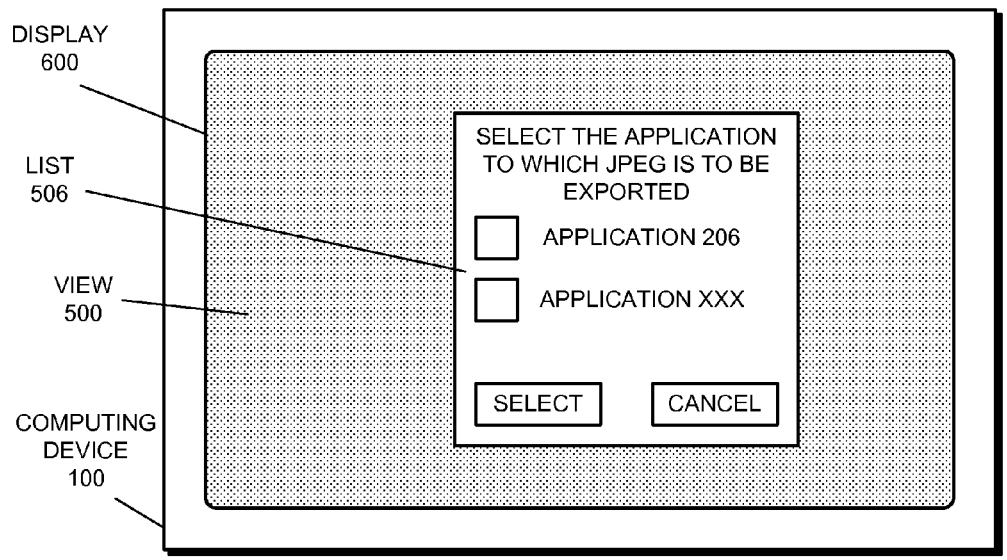
FIG. 6 presents a block diagram illustrating an interactive graphical user interface presented on a display for a computing device in accordance with some embodiments.

Broker application 300 then sends list 506 display subsystem 108 to be displayed on a display for display subsystem 108 to enable the user to select an application to which the data is to be exported. List 506 includes a list of applications on computing device 100 (e.g., application 206, etc.) that support the type of data indicated in request 504. List 506 may be presented using an interactive graphical user interface on a display in display subsystem 108 along with, and perhaps overlapping portions of, view 500 from application 204—so that, from the user's perspective, it appears that list 506 is being presented by application 204 (the user may be unaware that broker application 300 is involved in the export of the data). For example, the interactive graphical user interface in which list 506 is presented may include a list of applications and graphical elements (areas of text and/or graphics, buttons, menus, sliders, scrollbars, etc.) for controlling the selection of an application from the list of applications which is presented so that the interactive graphical user interface for list 506 overlaps at least some of view 500 (view 500 may take up the entire display behind the interactive graphical user interface for list 506). FIG. 6 presents a block diagram illustrating the interactive graphical user interface for list 506 (shown simply as "list 506") presented on display 600 for computing device 100 in accordance with some embodiments. As can be seen in FIG. 6, list 506 overlaps view 500 (which, as described above, would actually appear as an interface for application 204—but has been simplified to being shaded for FIG. 6).

When the user activates the graphical elements for list 506 to select an application to which the data is to be exported, e.g., hovers a mouse over an application identifier and clicks to select, touches a touch-sensitive screen over an application identifier, types in/selects an application identifier, etc., selection 508 is generated by display subsystem 108 (or an input-output subsystem (not shown) of computing device 100) and a message with selection 508 is sent to broker application 300. For this example, it is assumed that the user selected to export the data to application 206 and thus selection 508 includes one or more identifiers for application 206. After the user makes the selection, the interactive graphical user interface for list 506 is removed from display 600, leaving view 500 presented on the display screen of display subsystem without the interactive graphical user interface for list 506.

Upon receiving selection 508, broker application 300 determines that application 206 was selected by the user for exporting the data from application 204. Broker application 300 therefore generates request 510 and sends a message with request 510 to application 206 (which may involve at least partially starting/waking application 206 to receive the message with request 510). Request 510 includes an indication that the particular type of data (JPEG) is to be exported from application 204 to application 206, along with a request for a response from application 206 confirming that: (1) such an export is permissible to application 206 and possibly (2) information about particulars of export (e.g., a converter to be used, timing for export, a suggested directory for the export, etc.).

After analyzing request 510, application 206 sends a message with response 512 to broker application 300. Response 512 includes either a confirmation or a denial for proceeding with the export of the data from application 204 to application 206, along with other information (if any) about the export. For this example, it is assumed that response 512 includes a confirmation that the export is permissible to application 206 and no other information. It is possible, however, that, in response 512, application 206 could deny the export and/or could indicate a condition (e.g., a destination directory for outside application 206's sandbox, should application 206 be sandboxed) that broker application 300 is configured to deny. In this case, the mediated data exchange may be terminated, perhaps with a message sent to display subsystem 108 for display to the user indicating that the export of the data from application 204 has been terminated.

Along with response 512, application 206 sends view 514 to broker application 300. View 514 is an interactive graphical user interface for application 206 that provides the user with various displays and graphical elements (areas of text and/or graphics, buttons, menus, sliders, scrollbars, etc.) for controlling the operation of application 206. The graphical elements in view 514 enable a user of computing device 100 to indicate (via select, click, menu select, etc.) that the data from application 204 is to be exported from application 204 to application 206 in a given way (e.g., copied to a particular directory, etc.). Note that, although sent to broker application 300 (and eventually hosted in a frame presented by broker application 300), view 514 is presented and controlled by application 206. In other words, view 514 is an actual interface for application 206 and the graphical elements in view 514 directly control the operations of application 206. In some embodiments, view 514 is a complete/normal view of application 206's user interface (e.g., the interface for application 206 that is presented when application 206 is started up), although a custom/limited view of application 206 may also be presented.

Figure 7:
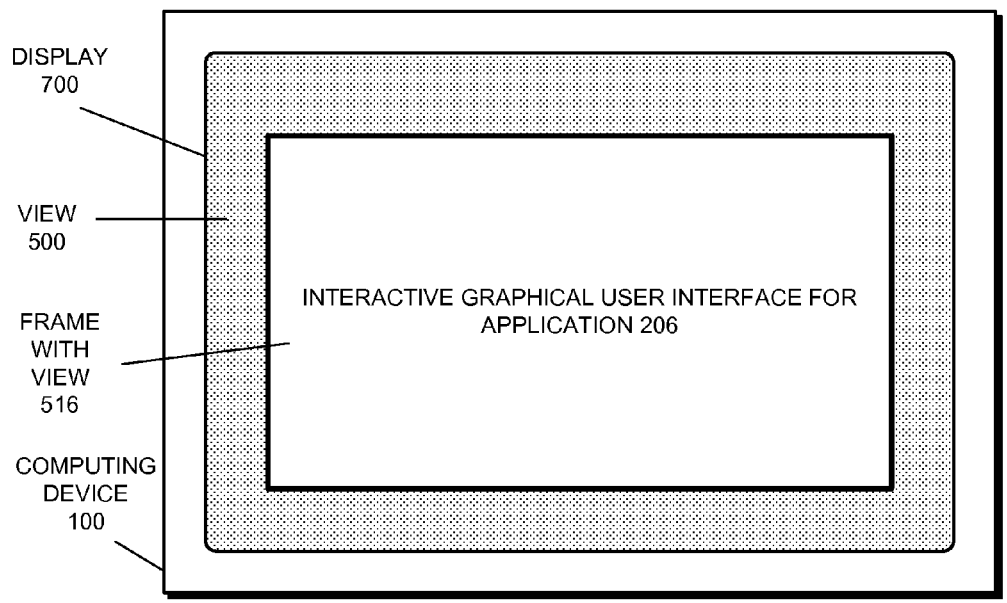
FIG. 7 presents a block diagram illustrating a frame with a view presented on display for a computing device in accordance with some embodiments.

Upon receiving response 512 with the confirmation and view 514, broker application 300 creates frame with view 516 (e.g., uses a graphics processing portion of operating system 200 to create a frame controlled by broker application 300 with view 514, which is presented and controlled by application 206, within the frame). Broker application 300 then sends frame with view 516 to display subsystem 108 to be displayed on a display for display subsystem 108. Display subsystem 108 presents frame with view 516 on the display in display subsystem 108 along with, and perhaps overlapping portions of, view 500 from application 204—so that, from the user's perspective, it appears that frame with view 516 is being presented by application 204 (again, the user may be unaware that broker application 300 is involved in the export of the data). Note that the frame may not be visible to the user or may be only minimally visible to the user (e.g., may include minimal or no visible elements). FIG. 7 presents a block diagram illustrating frame with view 516 presented on display 700 for a computing device 100 in accordance with some embodiments. As can be seen in FIG. 7, frame with view 516 (which would actually appear as an interactive graphical user interface for application 206—but has been simplified for FIG. 7), overlaps view 500 (which would also actually appear as an interface for application 204—but has been simplified to being shaded). Note that the frame is minimally visible in FIG. 7 (e.g., as a narrow dark perimeter around frame with view 516, etc.), and may be invisible/not displayed in some embodiments, thereby preserving the appearance that application 204 is performing the export of the data.

The user can then activate graphical elements in view 514 as presented in frame with view 516 to generate input 518, which controls application 206, e.g., hover a mouse over a menu item and click to select, touch a touch-sensitive screen over a button, type in/select an identifier, etc. For example, assuming that the user wanted to upload the above-described JPEG to a social media website, the user may activate various graphical elements in view 514 to cause display subsystem 108 to send input 518 to application 206 to command application 206 to take corresponding action.

Based on the command in input 518, application 206 generates configuration information 520. Configuration information 520 includes indications of how the data is to be exported from application 204 to application 206 that are to be used by broker application 300 when exporting the data. For example, configuration information 520 may include a directory for application 206 into which the exported data is to be placed, an action to be taken with the exported data by application 206 (e.g., upload the JPEG file to a social media website), etc.

Based on configuration information 520, broker application 300 generates request 522. Request 522 includes a request for application 204 to send data 524 (the JPEG) to broker application 300. Broker application 300 then sends a message with request 522 to application 204. Upon receiving request 522, application 204 responds by sending data 524 to broker application 300. Note that application 204 sends the data to broker application 300, and does not directly communicate data to application 206—such a communication would be prevented by operating system 200 due to the sandboxing of application 204. In some embodiments, "sending" data 524 to broker application 300 comprises application 204 simply acknowledging that the export of data 524 is still to be performed (e.g., remains permissible to application 204). Broker application 300, which has access permission for the data, then accesses data 524 wherever data 524 resides (e.g., in a directory for application 204).

Upon receiving data 524 (or the above-described acknowledgement), broker application 300 copies data 524 (as data 526) to application 206 in the manner indicated in configuration information 520. For example, broker application 300 can copy data 526 (recall, a JPEG file) to a social media website, can store data 526 in a directory for application 206, from where data 526 can be uploaded to the social media website by application 206, etc.

In some embodiments, broker application 300 closes frame with view 516 upon receiving an indication (e.g., a mouse hover over a close button in view 514 and a click to select, a finger press on an exit button in view 514, etc.) from the user that frame with view 516 should be closed. When frame with view 516 is closed, it leaves view 500 presented on the display screen of display subsystem without frame with view 516. Note, however, that, as long as frame with view is presented on the display of display subsystem 108, the user can interact with application 206 using any of the graphical elements, etc. in view 514. In other words, all the controls for application 206 function normally via view 514.

Note that, although a user is described above as activating graphical elements in view 500 to indicate to application 204 that a particular type of file is to be exported (the JPEG file), in some embodiments, the user may simply and generally indicate that a file is to be exported without specifying the type of file and/or otherwise identifying the file. In these embodiments, the operations shown above are similar, except that broker application 300 may, because no file type has been specified, present, in list 506, a list of all applications to which application 204 can export data. The user may then select an application for the export from list 506 (again possibly without specifying the file, the file type, etc.). Based on the selected application, broker application 300 may communicate a list of acceptable file types to application 206 in request 510. The list may then be used by application 206 to filter/select and indicate, to the user, files that can be exported to application 206. Based on a user selection of the file that is to be exported, the file can be exported as described above.

Using the described operations, sandboxed application 204 is able to export data via broker application 300 to application 206. In addition, as described above, when broker application 300 presents various interactive graphical interfaces to the user on the display, the user is not informed or shown that broker application 300 is being used during the export operation and the various interactive graphical interfaces that are presented appear to be spawned/generated by application 204, simplifying the user's experience during the export operation.

Mediated Data Exchange for Importing Data to a Sandboxed Application

Figure 8:
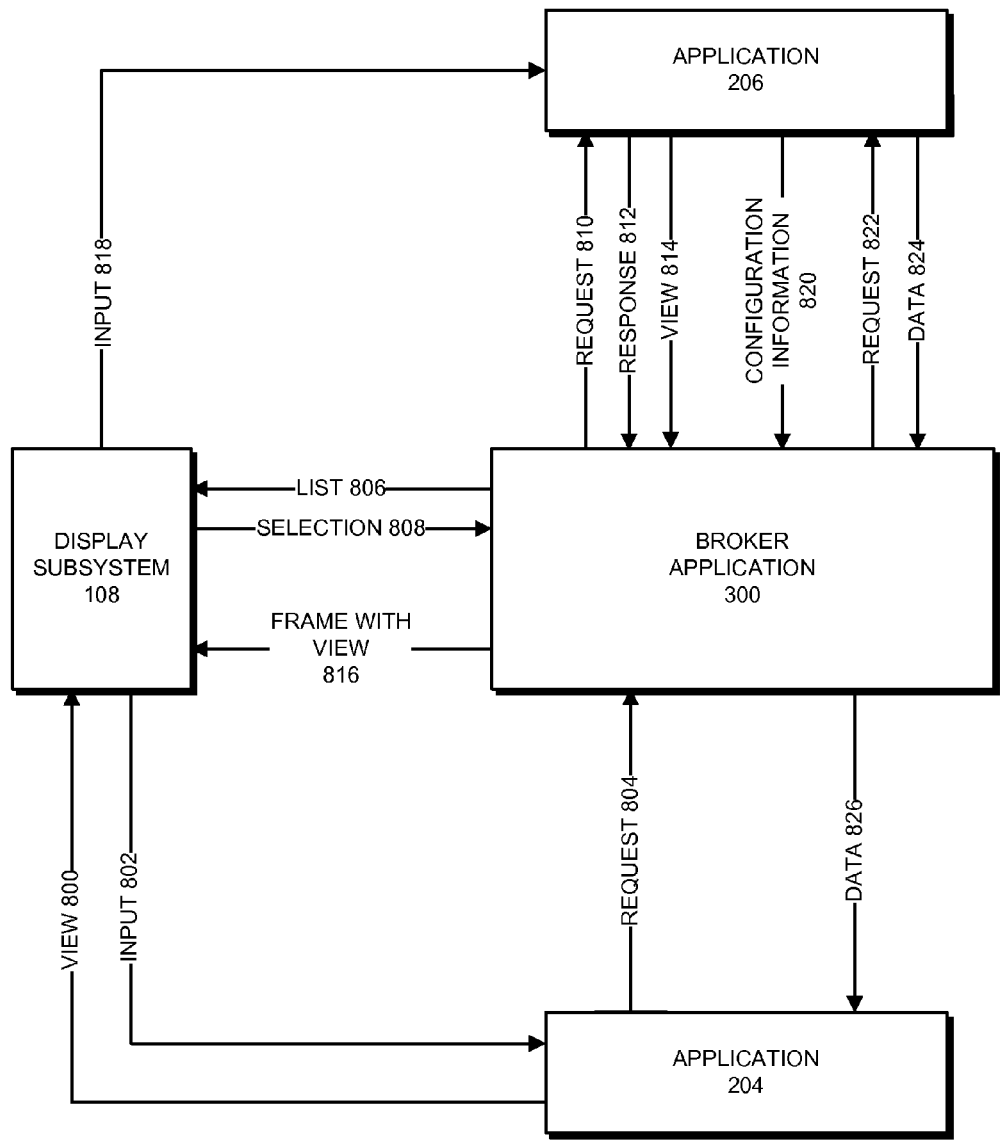
FIG. 8 presents a block diagram illustrating communications between applications and a broker application during a mediated data exchange in accordance with some embodiments.

FIG. 8 presents a block diagram illustrating communications between application 204, application 206, and broker application 300 during a mediated data exchange in accordance with some embodiments. More specifically, the mediated data exchange shown in FIG. 8 is an import of data to application 204 from application 206. Note that the operations and communications shown in FIG. 8 are presented as a general example of functions performed by some embodiments. The operations and communications performed by other embodiments include different operations/communications and/or operations/communications that are performed in a different order. Additionally, although applications 204 and 206 are used in describing the process, in some embodiments, other applications perform at least some of the operations.

For the example shown in FIG. 8, it is assumed that application 204 is a media processing application and application 206 is a social media application. It is also assumed that the data to be imported during the import operation is a JPEG file (i.e., an image file) that is to be imported from a social media website using application 206 so that the JPEG file can be edited in application 204. As described above (for FIG. 5), although this example is used for FIG. 8, in other embodiments, one or both of application 204 and 206 may be different types of application, and the mediated data exchange may be used to import different types of data from application 204 to application 206. Generally, the described embodiments are operable with any two (or more) applications that can communicate with broker application 300 and import data.

For the example in FIG. 8, it is further assumed that application 204 is sandboxed (as shown in FIG. 3), which means that operating system 200 permits application 204 to access only a limited set of resources in computing device 100 and prevents application 204 from directly accessing application data (e.g., files, etc.) other than application 204's own data. In other words, without broker application 300 functioning as an intermediary as described below, application 204 would be unable to import the data from application 206. For the operations shown in FIG. 8, although shown as sandboxed in FIG. 3, application 206 may or may not be sandboxed (the communications/operations for the mediated data exchange are similar).

In the example below, various communications—which are generically referred to as "messages"—are described. Generally, these messages may be exchanged between the indicated entities (e.g., application 204 and broker application 300, etc.) using any communication protocol acceptable to both entities. For example, in some embodiments, the entities use an inter-application messaging mechanism provided by operating system 200 that adheres to a corresponding communication protocol. The messages are formatted (e.g., with header, payload, etc.) in accordance with the communication protocol.

The communications shown in FIG. 8 start when application 204 sends view 800 to display subsystem 108. View 800 is an interactive graphical user interface for application 204 that provides the user with graphical elements (areas of text and/or graphics, buttons, menus, sliders, scrollbars, etc.) for interacting with application 204 (i.e., for controlling the operations of application 204). At least some of the graphical elements in view 800 include "import" graphical elements. These elements enable a user of computing device 100 to indicate that an import operation is to be performed to import data from another application to application 204. When the user activates the graphical elements, e.g., hovers a mouse over an import menu item and clicks to select, touches a touch-sensitive screen over an import button, types in/selects a data identifier, etc., input 802 is generated by display subsystem 108 (or an input-output subsystem (not shown) of computing device 100) and is sent to application 204. For this example, it is assumed that the user activates the graphical elements in view 800 to indicate to application 204 that a JPEG file is to be imported, thereby causing a corresponding input 802 to be sent to application 204.

Upon receiving input 802 and determining that the data (i.e., a JPEG) is to be imported, application 206 sends a message with request 804 to broker application 300 to start the mediated data exchange with broker application 300. Generally, request 804 identifies the type of mediated data exchange and identifies the data, along with possibly including other information about the import. Thus, as described above, request 804 identifies the mediated data exchange as an import and identifies the file as a JPEG. Request 804 may also indicate file formats from which the data may be converted into a JPEG by application 204 (although this information may have been or may also have been indicated in the above-described registration). For example, if application 204 can convert a TIFF file to a JPEG file, request 804 may indicate this capability of application 204.

Broker application 300 analyzes request 804 to determine the type of mediated data exchange being requested by application 204 and the data to be exchanged. Upon determining from request 804 that a JPEG is to be imported to application 204, broker application 300 examines registration information from other applications in computing device 100 and determines that application 206 (and possibly other applications, e.g., application 202, etc.) either supports JPEGs directly, or one of application 204 or 206 provides a converter to convert a file format that application 206 supports to JPEG. For this example, it is assumed that application 206 supports JPEGs directly; otherwise a conversion operation may be performed by application 204 and/or application 206 during the mediated data exchange.

Broker application 300 then sends list 806 display subsystem 108 to be displayed on a display for display subsystem 108 to enable the user to select an application from which the data is to be imported. List 806 includes a list of applications on computing device 100 (e.g., application 206, etc.) that support the type of data indicated in request 804. List 806 may be presented using an interactive graphical user interface on a display in display subsystem 108 along with, and perhaps overlapping portions of, view 800 from application 204—so that, from the user's perspective, it appears that list 806 is being presented by application 204 (the user may be unaware that broker application 300 is involved in the import of the data). For example, the interactive graphical user interface in which list 806 is presented may include a list of applications and graphical elements (areas of text and/or graphics, buttons, menus, sliders, scrollbars, etc.) for controlling the selection of an application from the list of applications which is presented so that the interactive graphical user interface for list 806 overlaps at least some of view 800 (view 800 may take up the entire display behind the interactive graphical user interface for list 806). Although a figure is not presented for this operation, in some embodiments, the display on computing device 100 appears similar to the display shown in FIG. 6.

When the user activates the graphical elements for list 806 to select an application from which the data is to be imported, e.g., hovers a mouse over an application identifier and clicks to select, touches a touch-sensitive screen over an application identifier, types in/selects an application identifier, etc., selection 808 is generated by display subsystem 108 (or an input-output subsystem (not shown) of computing device 100) and a message with selection 808 is sent to broker application 300. For this example, it is assumed that the user selected to import the data from application 206 and thus selection 808 includes one or more identifiers for application 206. After the user makes the selection, the interactive graphical user interface for list 806 is removed from the display in display subsystem 108, leaving view 800 presented on the display screen of display subsystem without the interactive graphical user interface for list 806.

Upon receiving selection 808, broker application 300 determines that application 206 was selected by the user for importing the data to application 204. Broker application 300 therefore generates request 810 and sends a message with request 810 to application 206 (which may involve at least partially starting/waking application 206 to receive the message with request 810). Request 810 includes an indication that the particular type of data (JPEG) is to be imported from application 206 to application 204, along with a request for a response from application 206 confirming that: (1) such an import is permissible and possibly (2) information about particulars of the import (e.g., a converter to be used, timing for import, a suggested directory as a source for the data to be imported, etc.).

After analyzing request 810, application 206 sends a message with response 812 to broker application 300. Response 812 includes either a confirmation or a denial for proceeding with the import of the data from application 206 to application 204, along with other information (if any) about the import. For this example, it is assumed that response 812 includes a confirmation that the import is permissible to application 206 and no other information. It is possible, however, that, in response 812, application 206 could deny the import and/or could indicate a condition (e.g., a directory for import outside application 206's sandbox, should application 206 be sandboxed) that broker application 300 is configured to deny. In this case, the mediated data exchange may be terminated, perhaps with a message sent to display subsystem 108 for display to the user indicating that the import of the data to application 204 has been terminated.

Along with response 812, application 206 sends view 814 to broker application 300. View 814 is an interactive graphical user interface for application 206 that provides the user with various displays and graphical elements (areas of text and/or graphics, buttons, menus, sliders, scrollbars, etc.) for controlling the operation of application 206. The graphical elements in view 814 enable a user of computing device 100 to indicate (via select, click, menu select, etc.) that the data from application 206 is to be imported to application 204 in a given way (e.g., copied from a particular directory for application 206, etc.). Note that, although sent to broker application 300 (and eventually hosted in a frame presented by broker application 300), view 814 is presented and controlled by application 206. In other words, view 814 is an actual interface for application 206 and the graphical elements in view 814 directly control the operations of application 206. In some embodiments, view 814 is a complete/normal view of application 206's user interface (e.g., the interface for application 206 that is presented when application 206 is started up), although a custom/limited view of application 206 may also be presented.

Upon receiving response 812 with the confirmation and view 814, broker application 300 creates frame with view 816 (e.g., uses a graphics processing portion of operating system 200 to create a frame controlled by broker application 300 with view 814, which is presented and controlled by application 206, within the frame). Broker application 300 then sends frame with view 816 to display subsystem 108 to be displayed on a display for display subsystem 108. Display subsystem 108 presents frame with view 816 on the display in display subsystem 108 along with, and perhaps overlapping portions of, view 800 from application 204—so that, from the user's perspective, it appears that frame with view 816 is being presented by application 204 (again, the user may be unaware that broker application 300 is involved in the import of the data). Note that the frame may not be visible to the user or may be only minimally visible to the user (e.g., may include minimal or no visible elements). Although a figure is not presented for this operation, in some embodiments, the display appears similar to the display shown in FIG. 7.

The user can then activate graphical elements in view 814 as presented in frame with view 816 to generate input 818, which controls application 206, e.g., hover a mouse over a menu item and click to select, touch a touch-sensitive screen over a button, type in/select an identifier, etc. For example, assuming that the user wanted to download the above-described JPEG from a social media website, the user may activate various graphical elements in view 814 to cause display subsystem 108 to send input 818 to application 206 to command application 206 to take the corresponding action.

Based on the command in input 818, application 206 generates configuration information 820. Configuration information 820 includes indications of how the import of data from application 204 to application 206 is to be performed that are to be used by broker application 300 when performing the import of data into application 204. For example, configuration information 820 may include a directory for application 206 from which the imported data is to be acquired, an action to be taken to acquire the data by application 206 (e.g., download the JPEG file from a social media website), etc.

Based on configuration information 820, broker application 300 generates request 822. Request 822 includes a request for application 206 to send data 824 (the JPEG) to broker application 300. Broker application 300 then sends a message with request 822 to application 204. Upon receiving request 822, application 206 responds by sending data 824 to broker application 300. Note that application 206 sends the data to broker application 300, and does not directly communicate data to application 204—such a communication would be prevented by operating system 200 due to the sandboxing of application 204. In some embodiments, "sending" data 824 to broker application 300 comprises application 206 simply acknowledging that the import of data 824 from application 206 to application 204 is still to be performed (e.g., remains permissible to application 206). Broker application 300, which has access permission for the data, then accesses data 824 wherever data 824 resides (e.g., in a directory for application 206).

Upon receiving data 824 (or the above-described acknowledgement), broker application 300 copies data 824 (as data 826) from application 206 to application 204 in the manner indicated in configuration information 820. For example, broker application 300 can download data 824 (the JPEG) from a social media website, can acquire data 824 from a directory for application 206, from where data 826 can be copied into a designated directory for application 204, etc.

In some embodiments, broker application 300 closes frame with view 816 upon receiving an indication (e.g., a mouse hover over a close button in view 814 and a click to select, a finger press on an exit button in view 814, etc.) from the user that frame with view 816 should be closed. When frame with view 816 is closed, it leaves view 800 presented on the display screen of display subsystem without frame with view 816. Note, however, that, as long as frame with view is presented on the display of display subsystem 108, the user can interact with application 206 using any of the graphical elements, etc. in view 814. In other words, all the controls for application 206 function normally via view 814.

Note that, although a user is described above as activating graphical elements in view 800 to indicate to application 204 that a particular type of file is to be imported (the JPEG file), in some embodiments, the user may simply and generally indicate that a file is to be imported without specifying the type of file and/or otherwise identifying the file. In these embodiments, the operations shown above are similar, except that broker application 300 may, because no file type has been specified, present, in list 806, a list of all applications from which application 204 can import data. The user may then select an application for the import from list 806

(again possibly without specifying the file, the file type, etc.). Based on the selected application, broker application 300 may communicate a list of acceptable file types to application 206 in request 810. The list may then be used by application 206 to filter/select and indicate, to the user, files that can be imported to application 206. Based on a user selection of the file that is to be imported, the file can be imported as described above.

Using the described operations, sandboxed application 204 is able to import data via broker application 300 from application 206. Also, as described above, when broker application 300 presents various interactive graphical interfaces to the user on the display, the user is not informed or shown that broker application 300 is being used during the import operation and the various interactive graphical interfaces that are presented appear to be spawned/generated by application 204, simplifying the user's experience during the import operation. In addition, both of applications 204 and 206 are unaware of the other application in this process; both applications communicate with broker application 300 to perform the operations described.

Processes for Performing Mediated Data Exchanges

Figure 9:
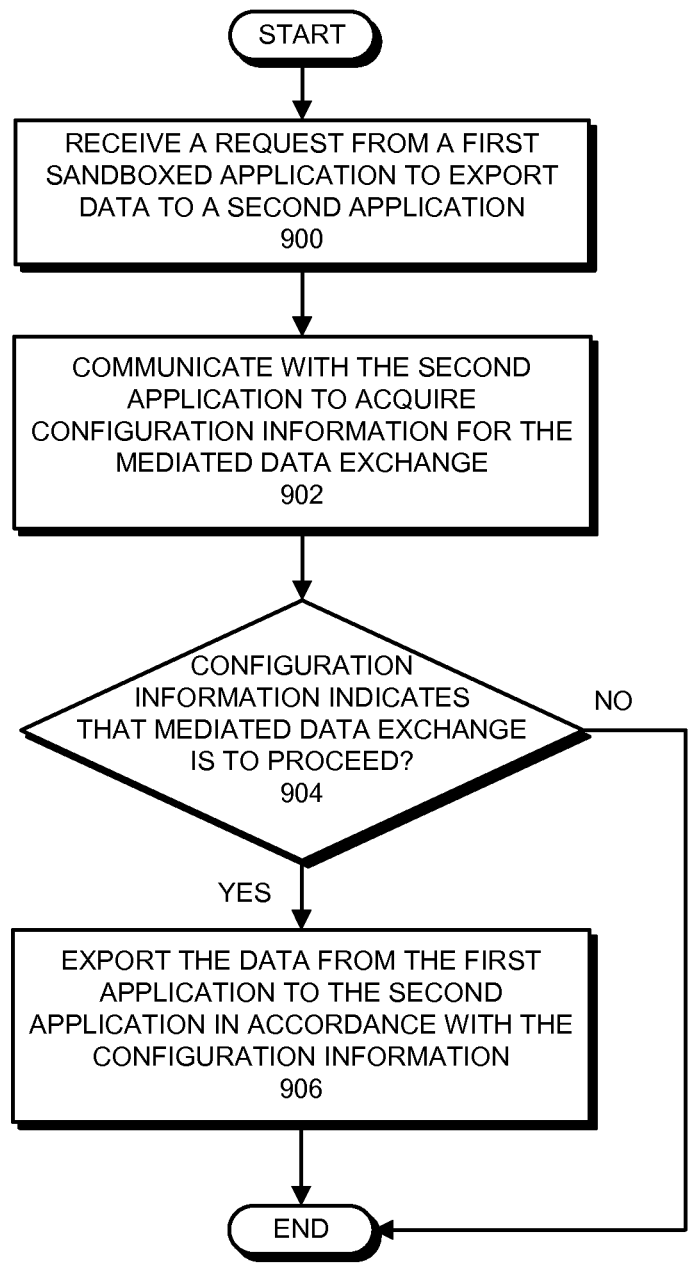
FIG. 9 presents a flowchart illustrating a process for performing a mediated data exchange in accordance with some embodiments.

FIG. 9 presents a flowchart illustrating a process for performing a mediated data exchange in accordance with some embodiments. More specifically, the mediated data exchange in FIG. 9 is an export of data from a first sandboxed application to a second application, for which the second application may or may not be sandboxed. Note that the operations shown in FIG. 9 are presented as a general example of functions performed by some embodiments. The operations performed by other embodiments include different operations and/or operations that are performed in a different order. In addition, although certain mechanisms in computing device 100 are used in describing the operations in FIG. 9, in some embodiments, other mechanisms can perform the operations.

The process shown in FIG. 9 starts when broker application 300 receives a request from a first sandboxed application (e.g., application 204) to export data (e.g., a file, a stream of data, etc.) to a second application (e.g., application 206) (step 900). For example, the application can send a message with a request such as request 504 to broker application 300.

Broker application 300 then communicates with the second application to acquire configuration information for the mediated data exchange (step 902). As described above, as part of this communication, broker application 300 requests that the second application confirm that it is permissible to proceed with the mediated data exchange and requests details about the mediated data exchange from the second application. For example, broker application 300 can receive an identifier of a destination directory for the data from the second application.

As described above, in some embodiments, various interactive graphical user interfaces are presented on a display of computing device 100 to enable a user to initiate and control the mediated data exchange. For example, in some embodiments, broker application 300 presents a frame with a view of the second application (perhaps overlapping a view of the first application) on a display of computing device 100 to enable a user to interact with the second application for controlling some or all of the mediated data exchange. For instance, for controlling operations performed by the second application using the data that is being exported from the first application to the second application. As another example, in some embodiments, broker application 300 presents an interactive graphical user interface with a list for selecting application 206 for the mediated data exchange. However, for clarity in describing the operations shown in FIG. 9, these operations are not described.

If the configuration information from the second application indicates that the mediated data exchange is not to proceed (step 904), the process ends. Note that, by performing this operation, broker application 300 provides the second application with the opportunity to deny the mediated data exchange.

Otherwise, if the configuration information from the second application indicates that the mediated data exchange is to proceed (step 904), broker application 300 exports the data from the first application to the second application in accordance with the configuration information (step 906). As described above, when exporting data from the first application to the second application, broker application 300 receives the data from the first application and forwards the received data from broker application 300 to the second application. For example, when the data is a file, broker application 300 may copy the file to a local directory for broker application 300 and may then may write the file from the local directory to a directory for the second application. As another example, when the data is a file, broker application 300 may copy the file from a directory for the first application to a directory for the second application.

Figure 10:
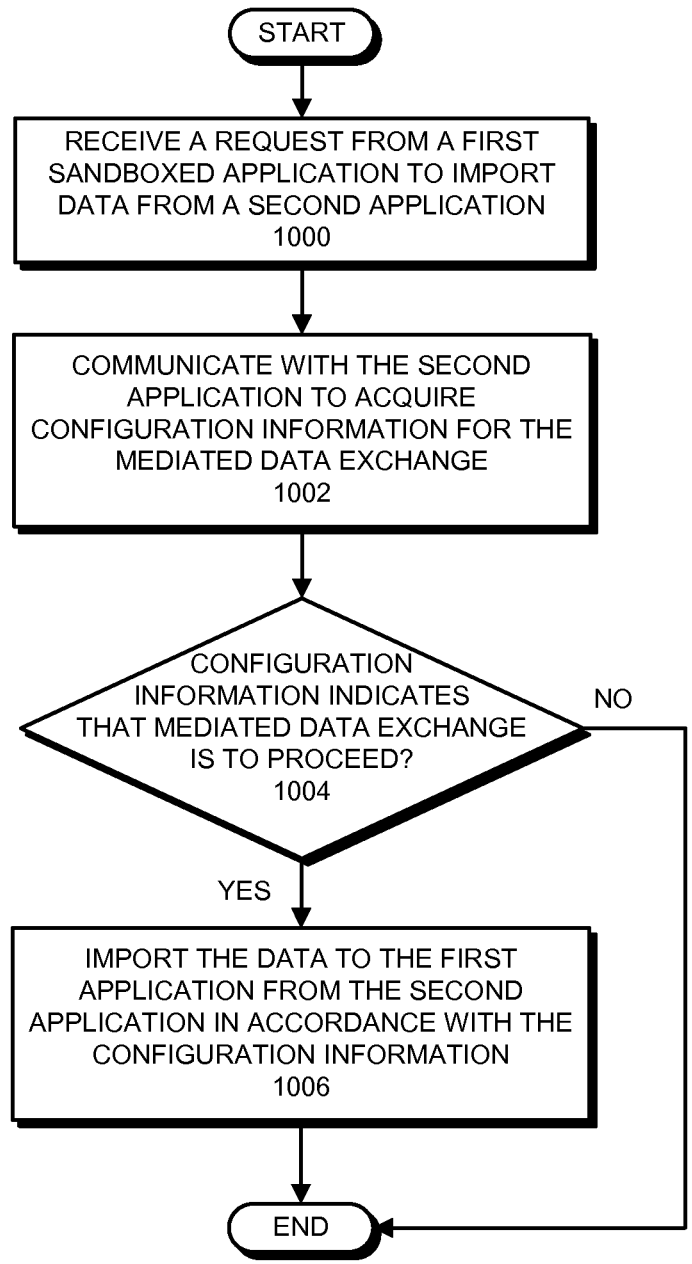
FIG. 10 presents a flowchart illustrating a process for performing a mediated data exchange in accordance with some embodiments.

FIG. 10 presents a flowchart illustrating a process for performing a mediated data exchange in accordance with some embodiments. More specifically, the mediated data exchange in FIG. 10 is an import of data to a first sandboxed application from a second application, for which the second application may or may not be sandboxed. Note that the operations shown in FIG. 10 are presented as a general example of functions performed by some embodiments. The operations performed by other embodiments include different operations and/or operations that are performed in a different order. In addition, although certain mechanisms in computing device 100 are used in describing the operations in FIG. 10, in some embodiments, other mechanisms can perform the operations.

The process shown in FIG. 10 starts when broker application 300 receives a request from a first sandboxed application (e.g., application 204) to import data (e.g., a file, a stream of data, etc.) from a second application (e.g., application 206) (step 1000). For example, the application can send a message with a request such as request 504 to broker application 300.

Broker application 300 then communicates with the second application to acquire configuration information for the mediated data exchange (step 1002). As described above, as part of this communication, broker application 300 requests that the second application confirm that it is permissible to proceed with the mediated data exchange and requests details about the mediated data exchange from the second application. For example, broker application 300 can receive an identifier of a source directory for the data from the second application.

As described above, in some embodiments, various interactive graphical user interfaces are presented on a display of computing device 100 to enable a user to initiate and control the mediated data exchange. For example, in some embodiments, broker application 300 presents a frame with a view of the second application (perhaps overlapping a view of the first application) on a display of computing device 100 to enable a user to interact with the second application for controlling some or all of the mediated data exchange. For instance, for controlling operations performed by the second application using the data that is being imported to the first application from the second application. As another example, in some embodiments, broker application 300 presents an interactive graphical user interface with a list for selecting application 206 for the mediated data exchange. However, for clarity in describing the operations shown in FIG. 10, these operations are not described.

If the configuration information from the second application indicates that the mediated data exchange is not to proceed (step 1004), the process ends. Note that, by performing this operation, broker application 300 provides the second application with the opportunity to deny the mediated data exchange.

Otherwise, if the configuration information from the second application indicates that the mediated data exchange is to proceed (step 1004), broker application 300 imports the data from the second application to the first application in accordance with the configuration information (step 1006). As described above, when importing data to the second application from the first application, broker application 300 receives the data from the second application and forwards the received data from broker application 300 to the first application. For example, when the data is a file, broker application 300 may copy the file to a local directory for broker application 300 and may then may write the file from the local directory to a directory for the first application. As another example, when the data is a file, broker application 300 may copy the file from a directory for the second application to a directory for the first application.

Views Presented by an Operating System and/or the Broker Application

In some embodiments, broker application 300 and/or operating system 200 present views similar to the above-described views presented by applications (e.g., view 514 and view 814). For example, in embodiments where utilities are provided by operating system 200 (e.g., for accessing files such as media files, etc. in operating system libraries), operating system 200 and/or broker application 300 may present views for the utilities (including for utilities that don't otherwise present views). As another example, in some embodiments, operating system 200 (or one of the applications) can provide a library of generalized views that applications may select instead of presenting a view such as view 514 and/or 814.

Background Imports and Exports

In some embodiments, when importing and exporting files from applications, broker application 300 may keep one or more of the applications operable (i.e., not completely close or exit the application) for the duration of the import or export. This can include broker application 300 presenting indications of progress (e.g., progress bars, etc.) that are displayed by the application(s) and/or operating system 200. In some embodiments, the applications are kept sufficiently operable to perform the transfer, but views for one or both of the application may no longer be presented on a display in display subsystem 108. Thus, one or both of the applications may run in the background while the import or export is completed. In these embodiments, if a user starts the application (e.g. click-selects an icon in the display that starts the application, etc.) while the import or export is in progress, broker application 300, operating system 200, and/or the application may present an indication that the import or export is in progress (e.g., present the above-described progress indicator).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a computing device in which a processing subsystem executes a first application in a first sandbox that prevents direct access by the first application to data and resources in the computing device that are outside the first sandbox and prevents direct access by a second application to data and resources within the first sandbox, comprising:

in the processing subsystem, performing operations for a broker application, the broker application being permitted access to the data and resources in the first sandbox, the operations comprising:
determining whether the second application has denied a mediated data exchange between the first application and the second application in the computing device;
in response to determining that the second application has not denied the mediated data exchange, performing the mediated data exchange between the first application and the second application in the computing device, the mediated data exchange comprising, when importing data from the second application to the first application, receiving the data from the second application in the broker application and forwarding the received data from the broker application to the first application within the first sandbox; and
in response to determining that the second application has denied the mediated data exchange, terminating the mediated data exchange.

2. The method of claim 1, wherein performing the mediated data exchange comprises:
in the broker application,
receiving, from the first application, a request to exchange data of a given type with an other application;
presenting, on a display coupled to the computing device, an identifier of one or more other applications that are configured to exchange data of the given type; and
receiving an indication of one of the other applications with which the mediated data exchange is to be performed, the indicated one of the other applications being the second application.

3. The method of claim 2,
wherein receiving, from the first application, the request to exchange data of the given type with an other application comprises receiving, from the first application, an identification of one or more additional data types to which the first application can convert data of the given type; and
wherein presenting, on the display coupled to the computing device, the identifier of one or more other applications that are configured to exchange data of the given type comprises presenting identifiers of other applications that are configured to exchange data of the one or more additional data types to which the first application can convert the data of the given type.

4. The method of claim 2, further comprising:
in the broker application,
receiving registrations from one or more other applications in the computing device, the registrations comprising type identifiers that identify one or more data types supported by the other applications; and creating a record of the one or more other applications and the data types supported by the one or more other applications, the record being used to determine the one or more other applications that are configured to exchange data of the given type.

5. The method of claim 1, wherein performing the mediated data exchange comprises:

in the broker application, presenting, on a display coupled to the computing device, a frame, wherein a view of the second application is hosted within the frame by the broker application, the view of the second application comprising at least one element that enables control of an aspect of the mediated data exchange.

6. The method of claim 5, wherein the broker application presents the frame in a predetermined location with respect to a view of the first application that is simultaneously presented on the display.

7. The method of claim 5, wherein presenting the frame operated by the broker application with the view of the second application within the frame comprises:

in the broker application, requesting the view of the second application from the second application; and receiving the view of the second application from the second application.

8. The method of claim 1, wherein performing the mediated data exchange comprises:

in the broker application, communicating with the second application to acquire configuration information for the mediated data exchange from the second application; and performing the mediated data exchange based on the configuration information.

9. The method of claim 1, wherein the mediated data exchange further comprises:

when exporting data from the first application to the second application, receiving the data from the first application within the first sandbox in the broker application and forwarding the received data from the broker application to the second application.

10. The method of claim 1, wherein the second application is executed in a second sandbox that is different than the first sandbox and that prevents direct access by the second application to data and resources in the computing device that are outside the second sandbox.

11. A computing device in which a first application is executed in a first sandbox that prevents direct access by the first application to data and resources in the computing device that are outside the first sandbox and prevents direct access by a second application to data and resources within the first sandbox, comprising:

a processing subsystem;

wherein the processing subsystem is configured to perform operations for a broker application, the broker application being permitted access to the data and resources in the first sandbox, the operations comprising:

determining whether the second application has denied a mediated data exchange between the first application and the second application in the computing device;

in response to determining that the second application has not denied the mediated data exchange, performing the mediated data exchange between the first application and the second application in the computing device, the mediated data exchange comprising, when importing data from the second application to the first application, receiving data from the second application in the broker application and forwarding the received data from the broker application to the first application within the first sandbox; and in response to determining that the second application has denied the mediated data exchange, terminating the mediated data exchange.

12. The computing device of claim 11, wherein the computing device comprises:

a display subsystem coupled to the processing subsystem, the display subsystem comprising a display;

wherein, when performing operations for the broker application, the processing subsystem is further configured to:

receive, from the first application, a request to exchange data of a given type with an other application;

present, on the display, an identifier of one or more other applications that are configured to exchange data of the given type; and receive an indication of one of the other applications with which the mediated data exchange is to be performed, the indicated one of the other applications being the second application.

13. The computing device of claim 12, wherein, when receiving, from the first application, the request to exchange data of the given type with an other application, the processing subsystem is configured to receive, from the first application, an identification of one or more additional data types to which the first application can convert data of the given type; and wherein, when presenting, on the display coupled to the computing device, the identifier of one or more other applications that are configured to exchange data of the given type, the processing subsystem is configured to present identifiers of other applications that are configured to exchange data of the one or more additional data types to which the first application can convert the data of the given type.

14. The computing device of claim 12, wherein, when performing operations for the broker application, the processing subsystem is further configured to:

receive registrations from one or more other applications in the computing device, the registrations comprising type identifiers that identify one or more data types supported by the other applications; and create a record of the one or more other applications and the data types supported by the one or more other applications, the record being used to determine the one or more other applications that are configured to exchange data of the given type.

15. The computing device of claim 11, further comprising:

a display subsystem coupled to the processing subsystem, the display subsystem comprising a display;

wherein, when performing operations for the broker application, the processing subsystem is further configured to:

present, on the display coupled to the computing device, a frame, wherein a view of the second application is hosted within the frame by the broker application, the view of the second application comprising at least one element that enables control of an aspect of the mediated data exchange.

16. The computing device of claim 15, wherein the processing subsystem is further configured to:
   present the frame in a predetermined location with respect to a view of the first application that is simultaneously presented on the display.

17. The computing device of claim 15, wherein, when performing operations for the broker application, the processing subsystem is further configured to:
   request the view of the second application from the second application; and
   receive the view of the second application from the second application.

18. The computing device of claim 11, wherein, when performing operations for the broker application, the processing subsystem is further configured to:
   communicate with the second application to acquire configuration information for the mediated data exchange from the second application; and
   perform the mediated data exchange based on the configuration information.

19. The computing device of claim 11, wherein, when performing operations for the broker application, the processing subsystem is further configured to:
   when exporting data from the first application to the second application, receive the data from the first application within the first sandbox in the broker application and forward the received data from the broker application to the second application.

20. The computing device of claim 11, wherein the second application is executed in a second sandbox that is different than the first sandbox and that prevents direct access by the second application to data and resources in the computing device that are outside the second sandbox.

21. A non-transitory computer-readable storage medium storing instructions that, when executed by a processing subsystem in a computing device in which the processing subsystem executes a first application in a first sandbox that prevents direct access by the first application to data and resources in the computing device that are outside the first sandbox and prevents direct access by a second application to data and resources within the first sandbox, cause the processing subsystem to perform operations for a broker application, the broker application being permitted access to the data and resources in the first sandbox, the operations comprising:
   determining whether the second application has denied a mediated data exchange between the first application and the second application in the computing device;
   in response to determining that the second application has not denied the mediated data exchange, performing the mediated data exchange between the first application and the second application in the computing device, the mediated data exchange comprising, when importing data from the second application to the first application, receiving the data from the second application in the broker application and forwarding the received data from the broker application to the first application within the first sandbox; and
   in response to determining that the second application has denied the mediated data exchange, terminating the mediated data exchange.

22. The computer-readable storage medium of claim 21, wherein performing the mediated data exchange comprises:
   in the broker application,
     receiving, from the first application, a request to exchange data of a given type with an other application;
     presenting, on a display coupled to the computing device, an identifier of one or more other applications that are configured to exchange data of the given type; and
     receiving an indication of one of the other applications with which the mediated data exchange is to be performed, the indicated one of the other applications being the second application.

23. The computer-readable storage medium of claim 22, wherein receiving, from the first application, the request to exchange data of the given type with an other application comprises receiving, from the first application, an identification of one or more additional data types to which the first application can convert data of the given type; and
   wherein presenting, on the display coupled to the computing device, the identifier of one or more other applications that are configured to exchange data of the given type comprises presenting identifiers of other applications that are configured to exchange data of the one or more additional data types to which the first application can convert the data of the given type.

24. The computer-readable storage medium of claim 22, further comprising:
   in the broker application,
     receiving registrations from one or more other applications in the computing device, the registrations comprising type identifiers that identify one or more data types supported by the other applications; and
     creating a record of the one or more other applications and the data types supported by the one or more other applications, the record being used to determine the one or more other applications that are configured to exchange data of the given type.

25. The computer-readable storage medium of claim 21, wherein performing the mediated data exchange comprises:
   in the broker application,
     presenting, on a display coupled to the computing device, a frame, wherein a view of the second application is hosted within the frame by the broker application, the view of the second application comprising at least one element that enables control of an aspect of the mediated data exchange.

26. The computer-readable storage medium of claim 25, wherein the broker application presents the frame in a predetermined location with respect to a view of the first application that is simultaneously presented on the display.

27. The computer-readable storage medium of claim 25, wherein presenting the frame operated by the broker application with the view of the second application within the frame comprises:
   in the broker application,
     requesting the view of the second application from the second application; and
     receiving the view of the second application from the second application.

28. The computer-readable storage medium of claim 21, wherein performing the mediated data exchange comprises:
   in the broker application,
     communicating with the second application to acquire configuration information for the mediated data exchange from the second application; and
     performing the mediated data exchange based on the configuration information.

29. The computer-readable storage medium of claim 21, wherein the mediated data exchange further comprises:

when exporting data from the first application to the second application, receiving the data from the first application within the first sandbox in the broker application and forwarding the received data from the broker application to the second application.

30. The computer-readable storage medium of claim 21, wherein the second application is executed in a second sandbox that is different than the first sandbox and that prevents direct access by the second application to data and resources in the computing device that are outside the second sandbox.

\* \* \* \* \*